May 24, 1932.  L. DINESEN  1,859,500
MILKING APPARATUS
Filed Jan. 13, 1930   2 Sheets-Sheet 1
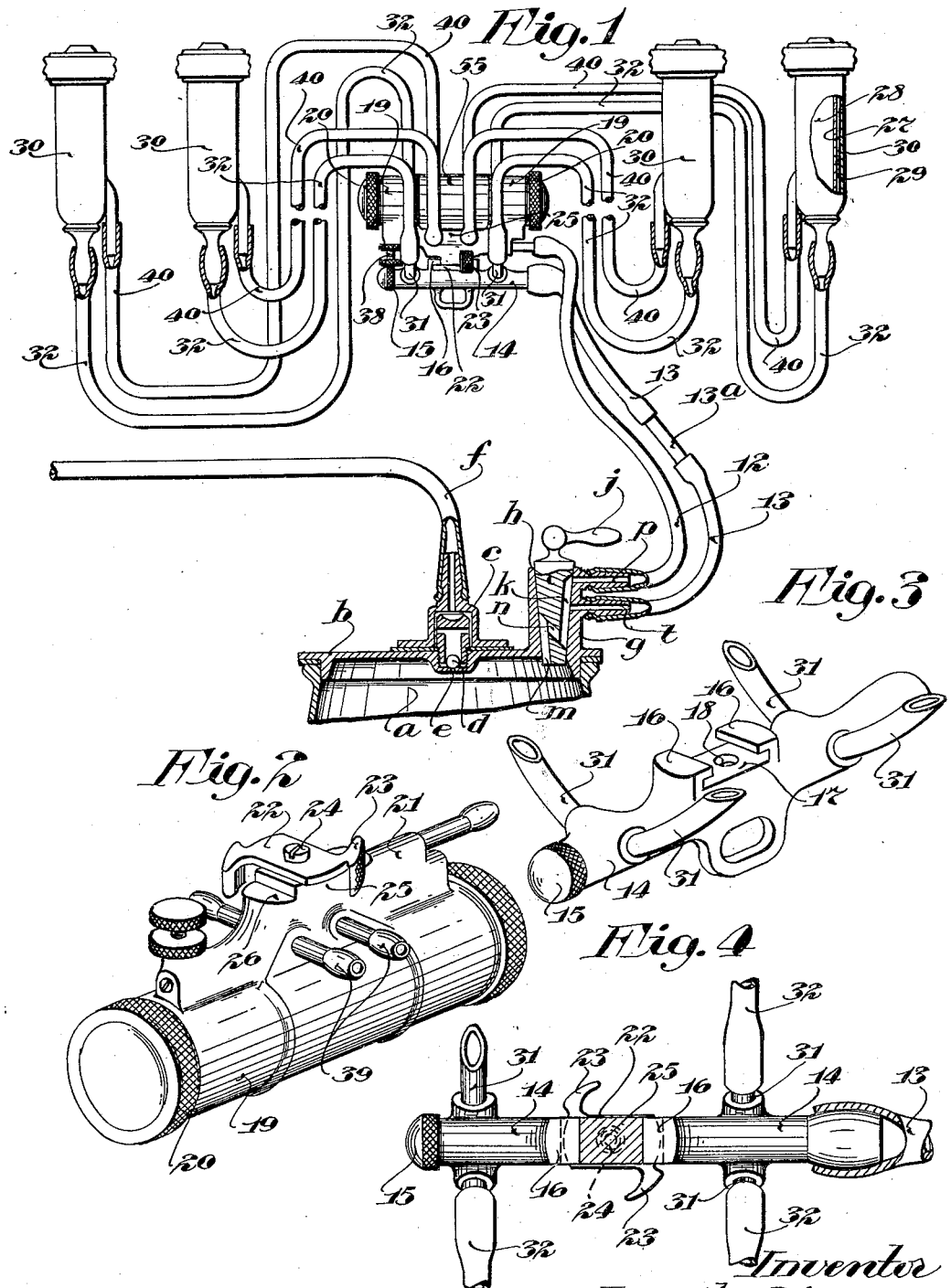

May 24, 1932.  L. DINESEN  1,859,500
MILKING APPARATUS
Filed Jan. 13, 1930   2 Sheets-Sheet 2
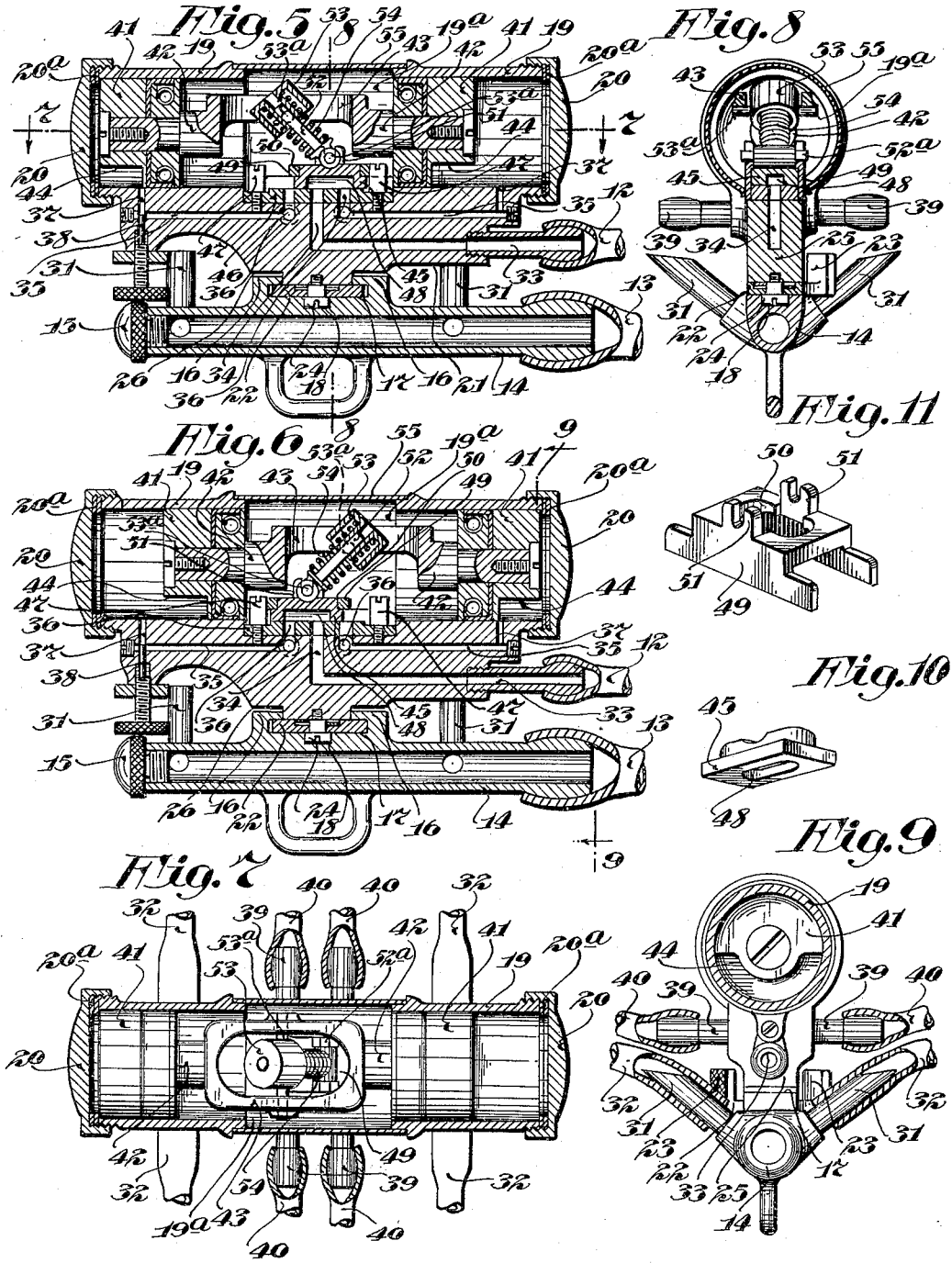
Inventor
Laurits Dinesen
By his Attorneys
Merchant Kilgore Patented May 24, 1932

1,859,500

UNITED STATES PATENT OFFICE

LAURITS DINESEN, OF MINNEAPOLIS, MINNESOTA

MILKING APPARATUS

Application filed January 13, 1930. Serial No. 420,455.

My invention relates to milking machines or apparatus, and is designed particularly as an improvement on that type of milking apparatus disclosed and claimed in my prior Patent No. 1,521,606 of January 6, 1925 and No. 1,654,795 of January 3, 1928, and wherein a group of teat cups and a pulsator are connected by flexible tubes to a milk can or receptacle in which partial vacuum is maintained. The novelty of the present invention resides largely in the pulsator or device which produces pressure pulsations required for efficient milking action, but the invention also involves certain other features as will hereinafter appear.

In the accompanying drawings, which illustrate a commercial form of the invention, like characters indicate like parts throughout the several views.

Referring to the drawings:

Fig. 1 is a view in elevation but with some parts sectioned and some parts broken away illustrating the improved machine or milking apparatus;

Fig. 2 is a perspective showing the cylinder and attached parts of the pulsator, the same being turned upside down;

Fig. 3 is a perspective showing the coupling tube of the pulsator detached from the cylindrical portion thereof;

Fig. 4 is a plan view of the coupling tube shown in detail in Fig. 3, with part of the cylinder casing in section coupled thereto by a lock device of novel construction;

Figs. 5 and 6 are vertical sections taken axially through the connected pulsator and coupling tube, but illustrating different positions of certain of the movable parts;

Fig. 7 is a horizontal section taken on the line 7—7 of Fig. 5;

Fig. 8 is a transverse section taken on the line 8—8 of Fig. 5;

Fig. 9 is a transverse section taken approximately on the irregular line 9—9 of Fig. 6;

Fig. 10 is a perspective showing in detail the slide valve of the pulsator removed from working position; and Fig. 11 is a perspective showing in detail the cross-head that carries the valve shown in detail in Fig. 10.

In referring to the above figures and directing attention particularly to Fig. 1, the character $a$ indicates a milk pail or receptacle provided with an air-tight cover $b$ equipped with a nipple $c$ in which is enclosed a check valve $d$ that normally closes an air discharge port $e$. The nipple $c$ is connected by a flexible tube $f$ and other connections, not shown, to a vacuum tank or other means for producing and maintaining a partial vacuum in the milk can $a$. The cover $b$ is provided with an upstanding sleeve $g$, the interior of which is preferably tapered to closely fit a tapered conical cut-off valve $h$ equipped with an operating handle $j$. The valve $h$ is provided with diametrically opposed upper and lower grooves $k$ and $m$ connected by an oblique port $n$. The sleeve $g$ is provided with outstanding nipples $p$ and $t$, which, as will hereinafter appear, afford air and milk ports respectively.

The numeral 12 indicates a flexible air tube and the numeral 13 a flexible milk tube, the delivery ends of which are connected respectively onto the nipples $p$ and $t$. Preferably, a glass tube section 13$^a$ is interposed in the milk tube 13 so that the flow of milk may be observed. The extended end of the milk tube 13 is connected to the receiving end of a tubular coupling head 14, the opposite end of which is connected by a plug 15. At its intermediate portion, the coupling tube or head 14 is formed with longitudinally spaced reversely facing L-shaped lock flanges 16 and between these flanges with a flat seating surface 17 having a central depression 18.

The cylinder 19 of the pulsator is tightly closed at its ends by removable cap-like cylinder heads 20 and on its under side is formed with a heavy longitudinally extended flange or block 21. A lock device in the form of a flat turn-button 22 having serrated end lugs 23 is pivotally connected by a machine screw 24 to a central portion 25 of the flange 21. This central portion 25 is adapted to fit between the lock flanges 16 of the coupling tube 14 and flange 21 is further provided with reversely facing longitudinally spaced notches 26 that receive the upper portions of said lock flanges 16. When the coupling tube or head is applied to the flange of the cylinder 19, as shown in Figs. 1, 4, 5 and 6, the head of the screw 24 will be seated in the recess 18, thereby holding the coupling tube against lateral movement in respect to the pulsator cylinder. When turn-button 22 is turned into the position shown in Fig. 2, it will freely enter between the lock flanges 16 and when it is then turned into the position shown in Figs. 4, 5 and 6, it will turn under the shoulders of flanges 16 and securely lock the coupling tube or head to the cylindrical body of the pulsator.

The teat cups shown in Fig. 1 are of the double-chamber type such, for example, as that disclosed in my prior Patent No. 1,201,808 of October 17, 1916 and comprise rubber or collapsible and expansible inner tubes 27, that form inner teat cup chambers 28 and surrounding air chambers 29 within outer metallic shells 30.

The coupling tube 14 is provided with four projecting milk tube nipples 31 arranged in pairs projecting from opposite sides and opposite edges of said tubes. These four nipples 31 are independently connected by branch milk tubes 32, each to the inner chamber 28 of the co-operating teat cup.

The pulsator cylinder 14 in its flange 21 is formed with a longitudinally extended air conduit 33 that terminates at its inner end in a central port 34. The outer end of air conduit 33 is connected to the extended free end of the air tube 12. Above the air conduit 33 the cylinder flange 21 is formed with secondary air ducts 35, the inner ends of which terminate in ports 36 located one on each side of the port 34, but all opening at a valve seat provided for the slide valve shown in detail in Fig. 10. At their outer extremities air ducts 35 terminate in ports 37 that open into opposite ends of the pulsator cylinder 19, one of the ports 37 is shown as provided with an adjustable choke valve 38 of the needle valve type, for regulation of the flow of air.

The pulsator cylinder 19 is provided with four nipples 39 arranged in pairs projecting from opposite sides of the cylinder flange 21. Two of the nipples 39 are connected to each of the secondary air conduits 35 and it is the axially aligned members of said nipples that are connected to the same secondary conduit. These air tubes 39 are independently connected by flexible air tubes 40 to the outer air chambers 29 of the respective co-operating teat cups.

Working within the pulsator cylinder 19 is a double-ended piston, the heads 41 of which are connected by a piston stem 42 formed with a central yoke-like portion 43. Here it will be noted that the piston heads 41, as preferably designed, are notched at 44 so that they never close ports 37.

The slide valve 45 shown in detail in Fig. 10 is arranged to slide on a face plate 46 secured at the bottom of the cylinder structure between its cylinder acting portions. This face plate 46, as shown, is secured to the cylinder casting by screws 47, the heads of which project upward and afford stops; and here it should be noted that the three ports 34—36 open upward through this face plate 46. Valve 45 is arranged to slide directly on the face plate 46 and is formed with a port-acting recess 48 which has such longitudinal extent that it will connect port 34 to one or the other of the ports 36 but only one at a time. Valve 45 is seated in a cross-head 49 that almost completely embraces the same and is formed with a recess 50 into which the upper portion of said valve is closely seated. The opposite ends of cross-head 49 are arranged to engage directly with the stop-acting heads of the screws 47, thereby preventing contact between said stops and the valve proper. On its top, cross-head is provided with notched laterally spaced lugs 51 that receive the laterally projecting trunnions 52$^a$ of a thrust bolt 52. This thrust bolt 52 is seated for endwise movement in a rocker head 53 that has laterally projecting trunnions 53$^a$ detachably seated in notches formed in the under sides of the yoke-like portion 43 of piston stem 42. A coiled spring 54 is compressed between rocker 53 and the head of bolt 52 and is under considerable compression. This spring and extensible thrust connection just described perform an important function which will be more fully given in the description of the operation; but it may be here noted that the said spring affords a detachable connection that keeps the trunnions of bolt 52 engaged with the lugs 51 and the trunnions of rocker 53 engaged with the notches of yoke 43.

To afford ready access to the interior mechanism of the pulsator, the pulsator cylinder proper is formed with longitudinally spaced cylinder acting portions, as best shown in Figs. 5 and 6, and to close the space 19$^a$ between these cylinder-acting portions, there is provided a split cylinder shell 55 that is arranged to be sprung onto and off from the cylinder structure.

There will be considerable air leakage between the shell 55 and the spaced cylinder sections so that the air chamber 19$^a$ formed within said shell will be subject to atmospheric pressure and hence, whenever one or the other of the ports 36 is uncovered by valve 45, it will then be connected to the atmosphere and, of course, subject to atmospheric pressure. Pliable annular gaskets or washers 20$^a$ preferably of leather are clamped between the cylinder heads 20 and the ends of the cylinder sections 19. These washers afford pliable stops that engage and limit the extreme movement of the pistons 41. From the foregoing it will be understood that in this apparatus, partial vacuum will be maintained in the milk can or receptacle *a* and that when the apparatus is to be thrown into milking action, valve *h* will be set in the position shown in Fig. 1 so that the main air tube 12 and main milk tube 13 will be connected to the milk can and subjected to suction or partial vacuum, and the inner chambers 28 of the teat cups through the branch milk tubes 32 and main milk tube 13 will constantly be subject to this suction or partial vacuum. As will presently be noted, however, the outer air chambers 29 of the teat cups will, through the pulsator, be subjected to partial vacuum and atmospheric pressure.

Extreme movements of the double piston are illustrated in Figs. 5 and 6. In the position of the piston and valve 45 shown in Fig. 5, left-hand port 36 is connected to the atmosphere so that the outer air chambers 29 of the two left-hand teat cups will be subject to atmospheric pressure and their flexible inner shells 27 will be compressed; while at the same time right-hand port 36 by valve port 48 and air duct 34, will be subject to suction or partial vacuum and hence will be expanded.

By reference to Fig. 6 it will be noted that in the reverse positions of the piston and valve above noted, it will be the outer air chambers 29 of the two right-hand teat cups that are connected to the atmosphere and hence contracted and the air chambers of the two left-hand teat cups that are subject to suction or partial vacuum and hence expanded. The valve 48 during all but short, almost infinitesimal periods of time remain stationary in the one position or the other while the piston will slowly move back and forth.

In the position of the piston and valve shown in Fig. 5, the left-hand end of the divided cylinder is connected to the atmosphere through left-hand ports 36 and 37 while the right-hand end of said cylinder is subject to suction or partial vacuum maintained in air pipe 12 through the right-hand ports 36 and 37. This condition causes the piston to move toward the right against the tension of the spring 54, which latter will be compressed until the thrust bolt 52 is moved slightly past its dead center toward the position shown in Fig. 6, and thereupon, the spring, with an almost instantaneous action, moves valve 45 to the reversed position shown in Fig. 6. Obviously, when said valve makes the above noted quick movement, it produces the reverse condition above noted in respect to the pulsating action and then connects the right-hand end of the cylinder to atmosphere and the left-hand end of said cylinder to the source of suction or partial vacuum. As already noted, the heads of the screws 47 limit the movements of valve 45 by engagement with its cross-head 49, thus avoiding any contact or offsetting action by engagement with the valve proper in the vicinity of its face. Also, it will be noted that when the valve is given its above noted quick movement against one of the stops 47, spring 54 will then act in a direction to accelerate the movement of the piston toward its extreme position.

Your attention, however, is here called to the fact that valve 45 will make its shift for reversal of the piston movement before the piston has completed its movement in the direction that it was moving when said valve was shifted and this, of course, establishes a relation of pressure and partial vacuum in the opposite ends of the cylinder which tends to cut short said movement of the piston. Whether or not the piston completes a movement in any direction to its extreme position will depend somewhat on the condition of the flow of milk through the trap formed in valve *h*. When there is a full flow of milk from the teat cups through the delivery tubes and the trap noted, the partial vacuum in the can A acting through the trap and air tube 12 will move the piston of the pulsator more slowly than when there is but a partial flow of milk through said trap. This gives just the action desired, to wit: When the flow of milk from the teat cups is very free, the piston will move quite slowly thereby producing relatively long and strong pulsations in the teat cups, but in finishing the milking action, which is known as "stripping", the flow of milk is very greatly decreased. The pulsator and piston will make shorter and more rapid reciprocating movements and the pressure pulsations in the teat cups will be relatively short and less intense. The action above described closely approximates that produced by expert hand milkers.

In practice it has been found that the spring-acting thrust rod or thrust connection between the piston and valve delays the movement of the valve until the piston has made more than one-half of its movement and under very slight friction and then with instantaneous action imparts a reverse movement to the valve. The result of this is that the pulsator operates reliably.

As already pointed out this spring-acting thrust member can be inserted or removed by a very simple and quick action since it requires simple compression of its spring 54 and forcing of its ends closer together will accomplish either of such actions. The speed at which the pistons will reciprocate and hence at which the pulsations in the teat cups will be produced may be varied by adjustment of the choke valve 38. As is evident by inspection particularly of Figs. 5 and 6, the flat-faced slide valve 45, throughout its movements, is kept tightly pressed against its flat seat 46, by the tension of the spring in the thrust-acting toggle. It is also evident that when the parts are to be disassembled, the valve and its seat may be laterally separated by applying manual force to compress the spring of the toggle.

When the milking appaartus is applied to a cow, the pulsator and the coupling head should, of course, be connected together, but for cleaning purposes it is important that they be separated. This connection and separation may, as already indicated, be very quickly accomplished simply by turning the turn button or lock piece 22. The foregoing is a description of a commercial milking apparatus in what is believed to be its preferred form, but it will, of course, be understood that the invention is capable of various modifications as to details of construction and arrangement of parts all within the scope of the invention as herein disclosed and broadly claimed.

The pulsator described is designed to be suspended from the cow or group of teat cups applied to the cow but may be applied elsewhere, as for example, to the cover of a milk pail or receptacle.

What I claim is:

1. A pulsator mechanism adapted for use in milking apparatus comprising a cylinder structure, a double-ended piston working in said cylinder structure, said cylinder structure having a valve seat with intermediate and outer ports, said intermediate port being connected to a source of air pressure differing from atmospheric pressure, and said outer ports being connected to the opposite ends of said cylinder structure, a valve seated on said valve seat and movable to alternately connect said outer ports to said intermediate port, and to the atmosphere, and an endwise resilient thrust member pivotally connected to said valve and to said piston and movable from one side to the other of a dead center to shift said valve when said piston has moved a predetermined distance in either direction from extreme position, said valve and seat having pressure contacted laterally separable faces, normally pressed into contact by the endwise resilience of said thrust member.

2. A pulsator mechanism adapted for use in milking apparatus comprising a cylinder block having spaced axially aligned cylinder sections, piston heads working in said cylinders, a piston stem connecting said piston head, said cylinder block having intermediate and outer air ports, the former of which is connected to a source of partial vacuum and said outer ports being connected to the outer portions of said cylinder sections, a valve slidable on said cylinder block and movable to alternately connect said intermediate port to said outer ports and said outer ports to the atmosphere, a crosshead in which said valve is seated for movement therewith, stops engageable with said cross-head to limit the movements of said valve, and an endwise resilient thrust member pivotally connected to said cross-head and to said piston stem and movable from one side to the other of a dead center, to shift said valve when the piston structure has moved a predetermined distance in either direction from extreme position, said valve and seat having pressure contacted laterally separable faces, normally pressed into contact by the endwise resilience of said thrust member.

3. A pulsator mechanism for milking apparatus comprising spaced cylinders, a valve seat carrying body connecting said cylinders in axial alignment, a valve slidable on said seat between said cylinders, a double ended piston slidable in said cylinders and having a yoke-like intermediate portion overlying said valve, and valve actuating means comprising a resilient thrust member operatively engaging opposed surfaces of said yoke-like piston portion and said valve under varying compression to hold said valve upon its seat and to cooperate with said valve and piston to shift said valve on its seat and exert pressure upon said piston to aid in completing the cycle of movement of said piston after the valve has been shifted.

In testimony whereof I affix my signature.

LAURITS DINESEN.